(12) United States Patent
Du et al.

(10) Patent No.: US 10,910,000 B2
(45) Date of Patent: Feb. 2, 2021

(54) METHOD AND DEVICE FOR AUDIO RECOGNITION USING A VOTING MATRIX

(71) Applicant: ADVANCED NEW TECHNOLOGIES CO., LTD., Grand Cayman (KY)

(72) Inventors: Zhijun Du, Hangzhou (CN); Nan Wang, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 51 days.

(21) Appl. No.: 16/216,771

(22) Filed: Dec. 11, 2018

(65) Prior Publication Data

US 2019/0115044 A1 Apr. 18, 2019

Related U.S. Application Data

(63) Continuation of application No. PCT/CN2017/088638, filed on Jun. 16, 2017.

(30) Foreign Application Priority Data

Jun. 28, 2016 (CN) .......................... 2016 1 0487584

(51) Int. Cl.
*G10L 25/51* (2013.01)
*G06F 16/00* (2019.01)
(Continued)

(52) U.S. Cl.
CPC .............. *G10L 25/51* (2013.01); *G06F 16/00* (2019.01); *G06F 17/16* (2013.01); *G06F 40/279* (2020.01); *G10L 15/02* (2013.01); *G10L 15/04* (2013.01)

(58) Field of Classification Search
CPC ................................................... G10L 19/018
See application file for complete search history.

(56) References Cited

U.S. PATENT DOCUMENTS 6,560,350 B2 5/2003 Rhoads
6,968,337 B2 * 11/2005 Wold ...................... G10L 25/00
(Continued)

FOREIGN PATENT DOCUMENTS

CN 1647160 A 7/2005
CN 1882984 A 12/2006
(Continued)

OTHER PUBLICATIONS

Office Action for Japanese Application No. 2018-568770 dated Feb. 18, 2020.
(Continued)

*Primary Examiner* — Michael N Opsasnick (57) ABSTRACT

A method for audio recognition comprises: dividing audio data to be recognized to obtain a plurality of frames of audio data; calculating, based on audio variation trends among the plurality of frames and within each of the plurality of frames, a characteristic value for each frame of the audio data to be recognized; and matching the characteristic value of each frame of the audio data to be recognized with a pre-established audio characteristic value comparison table to obtain a recognition result, wherein the audio characteristic value comparison table is established based on the audio variation trends among the frames and within each of the frames of sample data.

19 Claims, 7 Drawing Sheets

(51) Int. Cl.
  *G10L 15/02* (2006.01)
  *G06F 40/279* (2020.01)
  *G06F 17/16* (2006.01)
  *G10L 15/04* (2013.01)

(56) References Cited

U.S. PATENT DOCUMENTS

| | | | |
|---|---|---|---|
| 7,323,629 | B2 | 1/2008 | Somani et al. |
| 7,336,890 | B2 | 2/2008 | Lu et al. |
| 7,505,911 | B2 | 3/2009 | Roth et al. |
| 7,567,899 | B2 | 7/2009 | Bogdanov |
| 7,876,914 | B2 | 1/2011 | Grosvenor et al. |
| 7,881,931 | B2 | 2/2011 | Wells et al. |
| 8,082,150 | B2 * | 12/2011 | Wold ............ G06F 16/683 704/243 |
| 8,140,331 | B2 | 3/2012 | Lou |
| 8,150,044 | B2 | 4/2012 | Goldstein et al. |
| 8,725,829 | B2 | 5/2014 | Wang et al. |
| 8,990,073 | B2 | 3/2015 | Malenovsky et al. |
| 8,996,538 | B1 * | 3/2015 | Cremer ........... G06F 16/24578 707/749 |
| 9,076,459 | B2 | 7/2015 | Braho et al. |
| 9,401,153 | B2 | 7/2016 | Sharma et al. |
| 9,715,626 | B2 | 7/2017 | Kenyon et al. |
| 10,026,410 | B2 | 7/2018 | Gurijala et al. |
| 2005/0065976 | A1 | 3/2005 | Holm et al. |
| 2005/0177372 | A1 | 8/2005 | Wang et al. |
| 2007/0055500 | A1 | 3/2007 | Bilobrov |
| 2007/0071330 | A1 | 3/2007 | Oostveen et al. |
| 2007/0127717 | A1 | 6/2007 | Herre et al. |
| 2007/0168409 | A1 * | 7/2007 | Cheung ............... H04H 60/59 708/400 |
| 2008/0247677 | A1 | 10/2008 | Yoshino |
| 2010/0205174 | A1 | 8/2010 | Jiang et al. |
| 2011/0276157 | A1 * | 11/2011 | Wang ............... H04N 21/8549 700/94 |
| 2012/0209612 | A1 | 8/2012 | Bilobrov |
| 2013/0110521 | A1 | 5/2013 | Hwang et al. |
| 2013/0197913 | A1 * | 8/2013 | Bilobrov ............. G10L 19/018 704/270 |
| 2013/0322849 | A1 | 12/2013 | Kawana et al. |
| 2014/0074469 | A1 | 3/2014 | Zhidkov |
| 2014/0135964 | A1 | 5/2014 | Eom et al. |
| 2014/0142958 | A1 * | 5/2014 | Sharma ............... G10L 19/02 704/500 |
| 2014/0180673 | A1 * | 6/2014 | Neuhauser .......... G10L 19/018 704/9 |
| 2014/0180674 | A1 * | 6/2014 | Neuhauser .......... G10H 1/0008 704/9 |
| 2014/0277640 | A1 | 9/2014 | Bilobrov |
| 2014/0310006 | A1 * | 10/2014 | Anguera Miro ...... G10L 19/018 704/500 |
| 2015/0199974 | A1 | 7/2015 | Bilobrov et al. |
| 2016/0267178 | A1 | 9/2016 | Wang et al. |
| 2016/0293172 | A1 * | 10/2016 | Sharma ............... G10L 19/02 |
| 2016/0300579 | A1 * | 10/2016 | Bilobrov ............... G10L 25/51 |

FOREIGN PATENT DOCUMENTS

| | | |
|---|---|---|
| CN | 1957396 A | 5/2007 |
| CN | 1997989 A | 7/2007 |
| CN | 101014953 A | 8/2007 |
| CN | 101286200 A | 10/2008 |
| CN | 101493918 A | 7/2009 |
| CN | 101681381 A | 3/2010 |
| CN | 102314875 A | 1/2012 |
| CN | 103093761 A | 5/2013 |
| CN | 103403710 A | 11/2013 |
| CN | 103440313 A | 12/2013 |
| CN | 103548076 A | 1/2014 |
| CN | 103810236 A | 5/2014 |
| CN | 103999517 A | 8/2014 |
| CN | 104050259 A | 9/2014 |
| CN | 104252480 A | 12/2014 |
| CN | 104462537 A | 3/2015 |
| CN | 105118503 A | 12/2015 |
| CN | 105513587 A | 4/2016 |
| CN | 105653700 A | 6/2016 |
| EP | 1504445 B1 | 8/2008 |
| EP | 1730105 B1 | 1/2012 |
| JP | 2007065659 A | 3/2007 |
| JP | 2008-283658 A | 11/2008 |
| JP | 2009276776 A | 11/2009 |
| JP | 4788810 B2 | 10/2011 |
| JP | 2013-250720 A | 12/2013 |
| KR | 10-2013-010487 A | 9/2013 |
| KR | 20130104878 A | 9/2013 |

OTHER PUBLICATIONS

JaaP Haitsma, Ton Kalker, A Highly Robust Audio Fingerprinting System, Proc. 3rd International conference on Music Information Retrieval, Oct. 13, 2002, pp. 1-9, [Retrieved on Jan. 23, 2020], https://pdfs.semanticscholar.org/4f92/768276a0823cffeb9435ccda67beaca1f542.pdf.

Supplementary Search Report for Chinese Application No. 201610487584.9 dated Mar. 31, 2020.

Second Office Action for Chinese Application No. 201610487584.9 dated Apr. 3, 2020.

Search Report for European Application No. 17819122.7 dated Dec. 10, 2019 (9 pages).

Haitsma et al., "A Highly Robust Audio fingerprinting System," Proc. 3rd International Conference on Music Information Retrieval, Oct. 13, 2002 (9 pages).

Ouali et al., "A Robust Audio Fingerprinting Method for Content-Based Copy Detection," 2014 12th International Workshop on Content-based Multimedia Indexing (CBMI), IEEE, Jun. 18, 2014 (6 pages).

First Search for Chinese Application No. 201610487584.9 dated Jan. 19, 2020 (1 page).

Wang, "Content-based Massive Audio Efficient Retrieval", Wanfang Data Knowledge Service Platform, Apr. 20, 2015 with English Abstract (64 pages).

Written Opinion of the International Searching Authority and International Search Report for PCT Application No. PCT/CN2017/088638 dated Sep. 20, 2017 (15 pages).

International Preliminary Report on Patentability Chapter I for PCT Application No. PCT/CN2017/088638 dated Jan. 10, 2019 (12 pages).

Office Action and Search Report for Taiwanese Application No. 106112617 dated Aug. 22, 2018 (4 pages).

Office Action for Korean Application No. 10-2019-7002466 dated Jun. 30, 2020.

Jaap Haitsma et al., "A Highly Robust Audio Fingerprinting System", Proc. 3rd International Conference on Music Information Retrieval (2002 IRCAM), pp. 1-9, Oct. 13, 2002.

Supplementary Search Report for Chinese Application No. 201610487584.9 dated Jul. 9, 2020.

Notice of Allowance for Korean Application No. 10-2019-7002466 dated Nov. 23, 2020.

* cited by examiner

METHOD AND DEVICE FOR AUDIO RECOGNITION USING A VOTING MATRIX

CROSS-REFERENCE TO RELATED APPLICATIONS

The present application is a continuation application of International Patent Application No. PCT/CN2017/088638, filed on Jun. 16, 2017, which is based on and claims priority to the Chinese Patent Application No. 201610487584.9, filed on Jun. 28, 2016 and entitled "Method and Device for Audio Recognition." The above-referenced applications are incorporated herein by reference in their entirety.

TECHNICAL FIELD

The present disclosure relates to the field of data processing technologies, and in particular, relates to a method and a device for audio recognition.

BACKGROUND

Along with the continuously improved level of intelligence, smart terminals have been increasingly used in people's lives, such as interactive TV, audio recognition, and the like, which have recently emerged. For example, to find out the title of a song played in a car radio, what could have been done at most in the past was to record the song, and then to ask friends, or to listen to the lyrics and use the lyrics to search online.

Along with continuous development of intellectualization and recognition technologies, however, audio recognition can be achieved directly through smart terminals. So long as the music recognition function is turned on in a terminal, the title or singer of a song currently being played can be automatically recognized. The terminal can even directly connect to music software to play the song.

Figure 1:
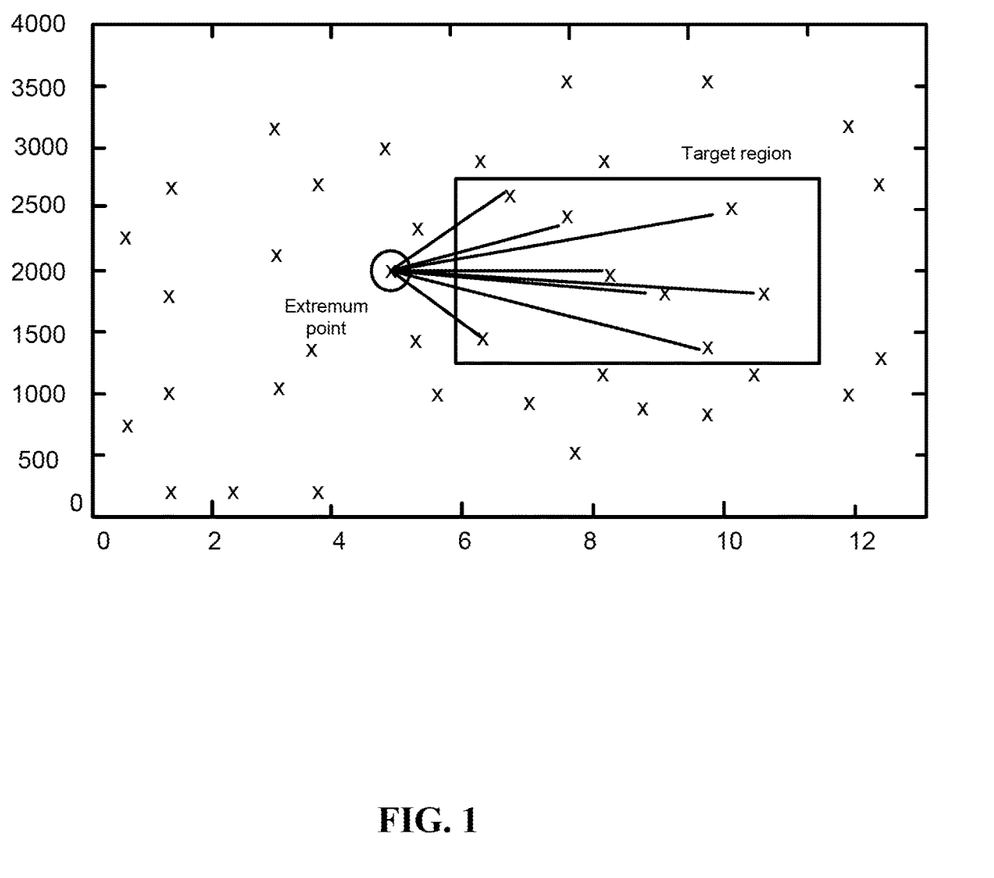
FIG. 1 is a schematic diagram of an existing method for audio recognition that is based on extraction of characteristic point pairs.

The above-described is a simple implementation scenario of audio fingerprint-based interactive TV or music recognition, which is, however, dependent on accurate audio recognition technologies. At present, primary audio recognition technologies are: extracting pairs of characteristic points, and using the characteristic points to recognize and determine audio. For example, as shown in FIG. 1, music is first converted to a sonogram, and several extremum points shown in FIG. 1 are extracted from the sonogram. To reduce the recognition difficulty and improve the recognition efficiency, recognition can be performed using point pairs, i.e., two extremum points forming one point pair. FIG. 1 illustrates seven point pairs. During recognition, the presence of identical point pairs is treated as a correct matching.

Due to impact of noise, however, extremum points do not necessarily occur at consistent locations, leading to a low probability of matching point pairs. In addition, these extremum points tend to be interfered by noise and are not very stable. Relatively stable recognition results cannot be obtained when noise is large.

No effective solution has been proposed at present with regard to the problems in the existing audio recognition technologies, i.e., a low matching success rate and low recognition accuracy due to the poor noise immunity.

SUMMARY

The present disclosure provides a method for audio recognition, which can effectively improve the matching success rate and the accuracy of recognition results.

The method for audio recognition, may comprise:
dividing audio data to be recognized to obtain a plurality of frames of the audio data;
calculating, based on audio variation trends among the plurality of frames and within each of the plurality of frames, a characteristic value for each frame of the audio data to be recognized; and
matching the characteristic value of each frame of the audio data to be recognized with a pre-established audio characteristic value comparison table to obtain a recognition result, wherein the audio characteristic value comparison table is established based on the audio variation trends among frames and within each of the frames of sample data.

In some embodiments, the method further comprises establishing the audio characteristic value comparison table, which comprises: acquiring sample data, wherein the sample data comprises multiple segments of sample audio; dividing each of the multiple segments of the sample audio to obtain a plurality of frames for the each segment of the sample audio; calculating, based on audio variation trends among the plurality of frames and within each of the plurality of frames of the each segment, a characteristic value of each frame of the each segment of the sample audio; using the characteristic values as root nodes, and according to the characteristic value of each frame of the each segment of sample audio, attaching each frame of the each segment of sample audio to a corresponding one of the root nodes to form a corresponding relationship; and using the corresponding relationships as the audio characteristic value comparison table.

In some embodiments, matching the characteristic value of each frame of the audio data to be recognized with a pre-established audio characteristic value comparison table to obtain a recognition result comprises: establishing a voting matrix, wherein the voting matrix is established according to the number of the segments of sample audio and the number of frames of each segment of sample audio; performing the following operations on each frame of the audio data to be recognized: looking up, in the audio characteristic value comparison table, one or more frames of sample audio that have the same characteristic value as that of the current frame of the audio data to be recognized, and marking a voting label at positions in the voting matrix corresponding to the one or more frames of sample audio that have the same audio characteristic value as that of the current frame of the audio data to be recognized; and using the segment of sample audio having the highest number of voting labels that exceeds a preset threshold as the recognition result.

In some embodiments, calculating, based on audio variation trends among the plurality of frames and within each of the plurality of frames, a characteristic value of each frame of the audio data to be recognized comprises: converting the each of the plurality of frames of the audio data to be recognized to vector data of a preset number of dimensions; converting the vector data of each frame of the audio data to be recognized to a binary sequence according to vector values between adjacent dimensions and vector values of adjacent frames in the vector data of each frame of the audio data; and using the binary sequence obtained from conversion as the characteristic value of a corresponding frame of the audio data, or using a decimal number corresponding to the binary sequence as the characteristic value of a corresponding frame of the audio data.

In some embodiments, converting the vector data of each frame of the audio data to be recognized to a binary sequence according to vector values between adjacent dimensions and vector values of adjacent frames in the vector data of each frame of audio data comprises: converting, according to the following equations, the vector data of each frame of the audio data to be recognized to a binary sequence:

$$\begin{cases} t1 = d_{i-2,j} - d_{i-2,j+1} \\ t2 = d_{i-1,j} - d_{i-1,j+1} \\ t3 = d_{i+1,j} - d_{i+1,j+1} \\ t4 = d_{i+2,j} - d_{i+2,j+1} \end{cases}$$

$$\text{diff} = -n*t1 - m*t2 + m*t3 + n2*t4$$

$$Bit_{i,j} = \begin{cases} 1 & \text{diff} > 0 \\ 0 & \text{otherwise} \end{cases}$$

where $d_{i-2,j}$ represents the vector value in the $j^{th}$ dimension of the $(i-2)^{th}$ frame of audio data, $d_{i-2,j+1}$ represents the vector value in the $(j+1)^{th}$ dimension of the $(i-2)^{th}$ frame of audio data, $d_{i-1,j}$ represents the vector value in the $j^{th}$ dimension of the $(i-1)^{th}$ frame of audio data, $d_{i-1,j+1}$ represents the vector value in the $(j+1)^{th}$ dimension of the $(i-1)^{th}$ frame of audio data, $d_{i+1,j}$ represents the vector value in the $j^{th}$ dimension of the $(i+1)^{th}$ frame of audio data, $d_{i+1,j+1}$ represents the vector value in the $(j+1)^{th}$ dimension of the $(i+1)^{th}$ frame of audio data, $d_{i+2,j}$ represents the vector value in the $j^{th}$ dimension of the $(i+2)^{th}$ frame of audio data, $d_{i+2,j+1}$ represents the vector value in the $(j+1)^{th}$ dimension of the $(i+2)^{th}$ frame of audio data, t1, t2, t3, t4 and diff represent intermediate variables, $Bit_{i,j}$ represents the value of the $j^{th}$ bit of the binary sequence of the $i^{th}$ frame of audio data, and n, m are constant coefficients.

In some embodiments, converting each frame of the audio data to be recognized to vector data of a preset number of dimensions comprises: converting, through an MFCC characteristic parameter extraction algorithm, each frame of the audio data to be recognized to vector data of a preset number of dimensions. In some embodiments, the preset number of dimensions is 12.

In some embodiments, matching the characteristic value of each frame of the audio data to be recognized with a pre-established audio characteristic value comparison table to obtain a recognition result comprises: matching the characteristic value of each frame of the audio data to be recognized with the pre-established audio characteristic value comparison table to find one or more segments of sample audio of the sample data having a matching degree of matching with the audio data to be recognized greater than the preset threshold; and determining the segment of sample audio having the highest matching degree among the one or more segments of sample audio as the recognition result.

In some embodiments, determining the segment of sample audio having the highest matching degree among the one or more segments of sample audio as the recognition result comprises: performing the following operations on each of the one or more segments of the sample audio: determining a number of the frames of the audio data to be recognized, acquiring a binary sequence for the each frame of the audio data to be recognized, acquiring a binary sequence for each frame of the current segment of sample audio corresponding to the audio data to be recognized, and determining the number of digits having the same bit positions but different bit values between the binary sequence for each frame of the audio data to be recognized and the binary sequence for each frame of the current segment of sample audio corresponding to the audio data to be recognized; and using the segment of sample audio having the least number of digits that have different bit values in the one or more segments of sample audio as the recognition result.

In some embodiments, dividing audio data to be recognized into frames comprises: dividing the audio data to be recognized into frames according to a division rule that adjacent frames are set to have an overlap of a preset number of milliseconds.

The present disclosure also provides a non-transitory computer-readable storage medium storing instructions executable by a processor to cause the processor to perform a method for audio recognition, the method comprising: dividing audio data to be recognized to obtain a plurality of frames of the audio data; calculating, based on audio variation trends among the plurality of frames and within each of the plurality of frames, a characteristic value for each frame of the audio data to be recognized; and matching the characteristic value of each frame of the audio data to be recognized with a pre-established audio characteristic value comparison table to obtain a recognition result, wherein the audio characteristic value comparison table is established based on the audio variation trends among frames and within each of the frames of sample data.

The present disclosure further provides a device for audio recognition, comprising: a frame dividing module configured to divide audio data to be recognized to obtain a plurality of frames of the audio data; a calculating module configured to calculate, based on audio variation trends among the plurality of frames and within each of the plurality of frames, to obtain a characteristic value of each frame of the audio data to be recognized; and a matching and recognizing module configured to match the characteristic value of each frame of the audio data to be recognized with a pre-established audio characteristic value comparison table to obtain a recognition result, wherein the audio characteristic value comparison table is established based on audio variation trends among frames and within each of the frames of sample data.

The method, non-transitory computer-readable storage medium and the device for audio recognition according to the present disclosure calculate, based on audio variation trends among frames and within each of the frames of audio data to be recognized, to obtain a characteristic value of each frame of the audio data to be recognized, and then match the characteristic value of each frame with a pre-established audio characteristic value comparison table to obtain a recognition result. A comparative relationship between frames and within a frame is used to obtain a relatively stable encoding result, thereby effectively resisting the interference by noise, and allowing more accurate recognition results. The solution according to the present disclosure improves not only greatly the noise immunity, but also the recognition success rate and the accuracy of recognition results.

BRIEF DESCRIPTION OF THE DRAWINGS

To more clearly describe technical solutions in the embodiments of the present disclosure or current technologies, the accompanying drawings used by the description of the embodiments or current technologies will be briefly described below. Obviously, the accompanying drawings in the following description are merely some embodiments of the present disclosure. To a person skilled in the art, other drawings may be derived from these accompanying drawings without creative effort.

DETAILED DESCRIPTION

To enable a person skilled in the art to better understand the technical solutions in the present disclosure, the technical solutions in the embodiments of the present disclosure will be clearly and completely described below with reference to the accompanying drawings in the embodiments of the present disclosure. Apparently, the described embodiments are merely some, but not all embodiments of the present disclosure. All other embodiments obtainable by a person skilled in the art without creative effort and on the basis of the embodiments of the present disclosure shall fall within the scope of the present disclosure.

To enable a person skilled in the art to better understand the technical solutions in the present disclosure, the technical solutions in the embodiments of the present disclosure will be clearly and completely described below with reference to the accompanying drawings in the embodiments of the present disclosure. Apparently, the described embodiments are merely some, but not all embodiments of the present disclosure. All other embodiments obtainable by a person skilled in the art without creative effort and on the basis of the embodiments of the present disclosure shall fall within the scope of the present disclosure.

Figure 2:
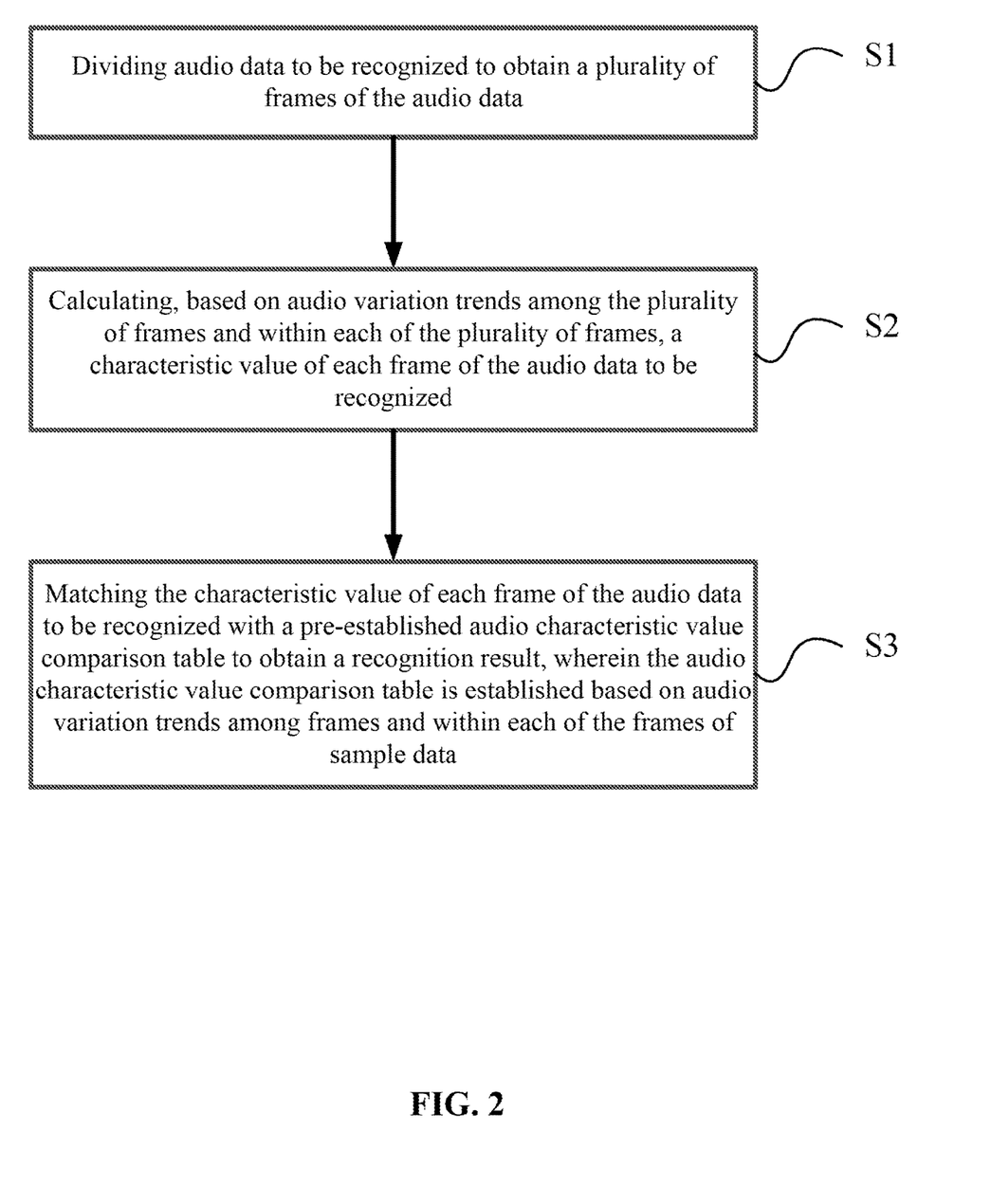
FIG. 2 is a flow chart of an exemplary method for audio recognition according to the present disclosure.

FIG. 2 is a flow chart of an exemplary method for audio recognition according to the present disclosure. The present disclosure provides operation steps of the method or device structure as shown in the following embodiments or accompanying drawings; however, more or fewer operation steps or modular units can be comprised in the method or device according to conventional practices or without creative effort. In the steps or structures without necessary causal relationship in terms of logic, the execution sequence of these steps or the modular structure of the device are not limited by the execution sequences or the modular structures described in the embodiments or illustrated in the accompanying drawings of the present disclosure. When applied in an exemplary device or terminal product, the methods or the modular structures can be executed sequentially or in parallel according to the methods or the modular structures shown in the embodiments or accompanying drawings (e.g., by parallel processors or in a multithreading environment, or even in a distributed processing environment).

As shown in FIG. 2, a method for audio recognition according to some embodiments of the present disclosure can comprise:

S1: dividing audio data to be recognized to obtain a plurality of frames of the audio data.

The audio data to be recognized can be a segment of speech recorded by audio recognition software, or a segment of speech from, e.g., interactive TV. The main purpose is typically to recognize the source of the segment of speech. After being recorded, the segment of speech can be divided into frames. For example, each 30 millisecond (ms) can be used as one frame of data. The number of ms selected as the length of one frame of audio data is not limited by the present disclosure, and can be selected according to actual needs, which can be 20 ms, 25 ms, 40 ms, and the like. However, it may be guaranteed that the rules for frame division of the audio data to be recognized is the same as the principles for frame division of the pre-established audio characteristic value comparison table.

Furthermore, deviation may occur during matching and recognition due to the impact of frame division. To reduce deviation, during frame division, the frames may be set to overlap with one another. Using 30 ms per frame as an example, the first frame is 0 to 30 ms, then the second frame is 16 ms to 45 ms, and the third frame is 30 ms to 60 ms. Therefore, the audio data to be recognized is divided into frames according to a division rule that adjacent frames are set to have an overlap of a preset number of milliseconds. In other words, adjacent frames overlap, thereby avoiding the impact of the deviation caused by frame division on matching results.

Prior to subsequent data processing, each frame of the audio data can be processed through Fast Fourier Transform (FFT) transformation to transform the audio data to a frequency domain, and to analyze signals in the frequency domain.

S2: calculating, based on audio variation trends among the plurality of frames and within each of the plurality of frames, a characteristic value of each frame of the audio data to be recognized.

In a process of determining characteristics, a characteristic vector of a preset number of dimensions (e.g., 12 dimensions) may be acquired by applying an MFCC characteristic parameter extraction algorithm on the frequency domain result obtained after the above-described FFT transformation. The MFCC characteristic parameter extraction algorithm is used because significant varying regions in signals can be extracted in speech recognition for the MFCC characteristic, allowing good differentiation. MFCC is an acronym of Mel Frequency Cepstral Coefficient, wherein Mel frequency is developed based on human hearing characteristics and has a nonlinear corresponding relationship with Hz frequency. Mel Frequency Cepstral Coefficients (MFCCs) are Hz spectral characteristics obtained through calculation using the relationship between Mel frequency and Hz frequency. Due to the nonlinear corresponding relationship between Mel frequency and Hz frequency, MFCC calculation accuracy decreases as the frequency increases. Therefore, only low-frequency MFCC is typically used in applications, while medium to high-frequency MFCC is discarded.

Figure 3:
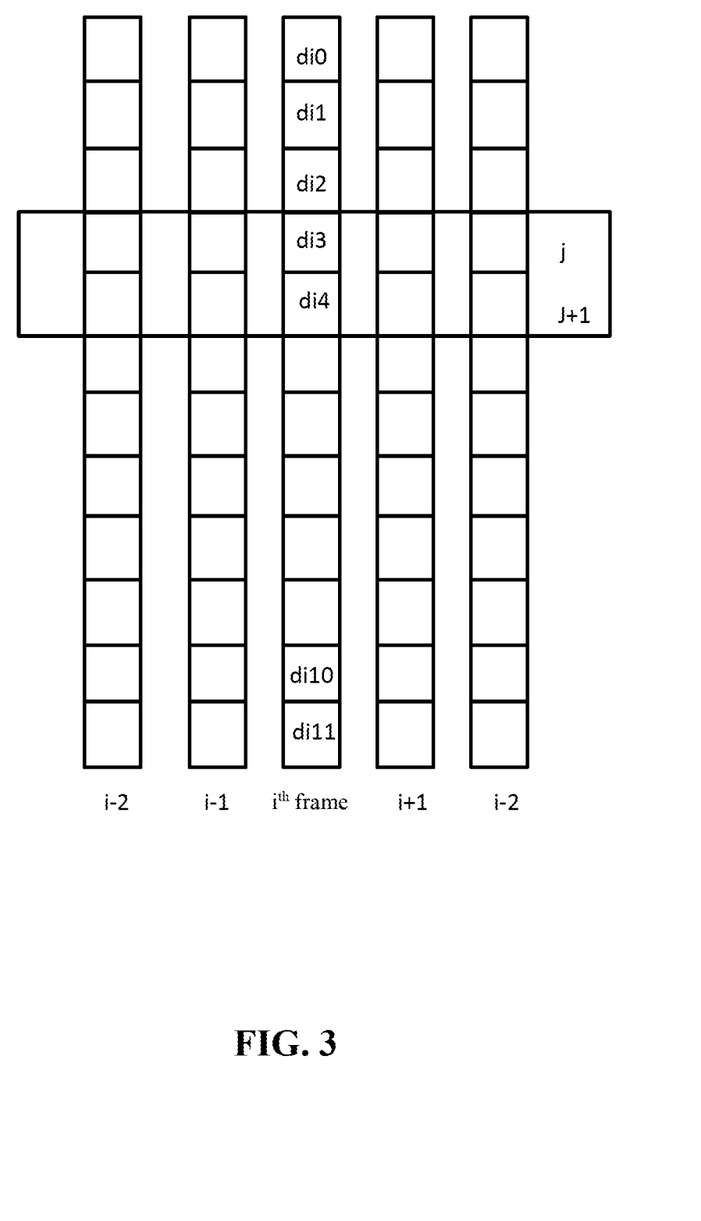
FIG. 3 is a schematic diagram of a characteristic vector according to the present disclosure.

After the MFCC characteristic calculation, signals in each frame are converted into a vector of a preset number of dimensions. Assuming that the vector is a 12-dimensional vector, then as shown in FIG. 3, signals in the $i^{th}$ frame can be expressed as $(d_{t0}, d_{t1} \ldots d_{t10}, d_{t11})$, d being a float type data. Furthermore, to make subsequent comparison and matching simpler, the obtained vector can be encoded and converted to a binary sequence or a positive number corresponding to the binary sequence. For example, the expression of frame characteristic vector shown in FIG. 3 can be encoded and converted in the following manner:

$$\begin{cases} t1 = d_{i-2,j} - d_{i-2,j+1} \\ t2 = d_{i-1,j} - d_{i-1,j+1} \\ t3 = d_{i+1,j} - d_{i+1,j+1} \\ t4 = d_{i+2,j} - d_{i+2,j+1} \end{cases}$$

$$\text{diff} = -n*t1 - m*t2 + m*t3 + n2*t4$$

$$Bit_{i,j} = \begin{cases} 1 & \text{diff} > 0 \\ 0 & \text{otherwise} \end{cases}$$

where $d_{i-2,j}$ represents the vector value in the $j^{th}$ dimension of the $(i-2)^{th}$ frame of audio data, $d_{i-2,j+1}$ represents the vector value in the $(j+1)^{th}$ dimension of the $(i-2)^{th}$ frame of audio data, $d_{i-1,j}$ represents the vector value in the $j^{th}$ dimension of the $(i-1)^{th}$ frame of audio data, $d_{i-1,j+1}$ represents the vector value in the $(j+1)^{th}$ dimension of the $(i-1)^{th}$ frame of audio data, $d_{i+1,j}$ represents the vector value in the $j^{th}$ dimension of the $(i+1)^{th}$ frame of audio data, $d_{i+1,j+1}$ represents the vector value in the $(j+1)^{th}$ dimension of the $(i+1)^{th}$ frame of audio data, $d_{i+2,j}$ represents the vector value in the $j^{th}$ dimension of the $(i+2)^{th}$ frame of audio data, $d_{i+2,j+1}$ represents the vector value in the $(j+1)^{th}$ dimension of the $(i+2)^{th}$ frame of audio data, t1, t2, t3, t4 and diff represent intermediate variables, $Bit_{i,j}$ represents the value of the $j^{th}$ bit of the binary sequence of the $i^{th}$ frame of audio data, and n, m are constant coefficients.

As shown in the above equations, the binary sequence is obtained through calculation according to vector values between adjacent dimensions and vector values of adjacent frames of vector data of each frame of audio data. For example, each frame of the audio data to be recognized is first converted to vector data of a preset number of dimensions; then, the vector data of each frame of audio data is converted to a binary sequence according to vector values between adjacent dimensions and vector values of adjacent frames in the vector data of each frame of the audio data.

For example, in the equations, the binary sequence is obtained according to vector values of two adjacent frames of data and adjacent vector values in the same frame. This way, the relationships between frames and within a frame (such as each of the frames) are effectively included in the calculation of characteristic values.

However, the above-described n, m can be selected as needed. For example, n, m can have values of 2 and 3, respectively. Correspondingly, diff=−2*t1−t2+t3+2*t4

Furthermore, two adjacent frames are used as a basis for calculation in the above examples and equations. In some embodiments, adjacent three frames or four frames, or the like can also be used. A proper number of frames can be selected according to actual calculation accuracy and processing capabilities of processors. When different numbers of frames are selected, the above equations need to be adjusted accordingly. However, the concept of adjustment is similar, which is not limited in the present disclosure.

In the process of obtaining a binary sequence through calculation in the manner described above, if the original vector dimension is N, then the digit of the binary sequence obtained through calculation is N−1. For example, if a 12-dimensional characteristic vector is obtained, then the obtained binary sequence has 11 digits.

In this example, the obtained binary sequence can be used as the characteristic value. Alternatively, a decimal number corresponding to the binary sequence can be used as the characteristic value. For example, if the binary sequence of a frame of audio data is 00000000101, then 00000000101 can be used as the ultimate characteristic value, or 5 can be used as the ultimate characteristic value.

In summary, coefficients of adjacent dimensions or bits (relationships) within a frame can be compared, which is deemed as comparison of intra-frame coefficients. Then, the comparison information of two adjacent frames is obtained. The information of these two adjacent frames and information within each of the frames are used to form the ultimate value diff. A result of comparing the value diff with zero "0" constitutes the ultimate encoded value of the corresponding digit. For example, after signals of one frame are transformed to a 12-dimensional characteristic coefficient vector through MFCC, the vector is encoded to become a 11-digit binary sequence ($Bit_{i,0}$, $Bit_{i,1}$ . . . $Bit_{i,10}$). If this binary sequence is converted to a decimal number, then the corresponding range is from 0 to $2^{11}$. The binary sequence and the decimal number represent the audio variation trends among the frames and within the frames.

S3: matching the characteristic value of each frame of the audio data to be recognized with a pre-established audio characteristic value comparison table to obtain a recognition result, wherein the audio characteristic value comparison table is established based on the audio variation trends among frames and within each of the frames of sample data.

To achieve effective matching of audio data, an audio characteristic value comparison table can be pre-established, which records each frame of data and a characteristic value corresponding to the frame of data. If the characteristic values are expressed in a binary format in the audio characteristic value comparison table, then accordingly during audio recognition, the audio data to be recognized will be converted to a binary sequence as the characteristic value. If the characteristic values are expressed in a decimal format in the audio characteristic value comparison table, then accordingly during audio recognition, the audio data to be recognized will be converted to a decimal number as the characteristic value.

In some embodiments, the audio characteristic value comparison table can be established in the following manner:

Step 1: acquiring sample data, wherein the sample data comprises multiple segments of sample audio;

Step 2: dividing each of the multiple segments of sample audio to obtain a plurality of frames of audio data for the each segment of sample audio;

Step 3: calculating, based on audio variation trends among the plurality of frames and within each of the plurality of frames, a characteristic value of each frame of the each segment of sample audio;

Step 4: using the characteristic values as root nodes, and according to the characteristic value of each frame of the each segment of sample audio, attaching each frame of the each segment of sample audio to a corresponding one of the root nodes to form a corresponding relationship;

Step 5: using the corresponding relationships as the audio characteristic value comparison table.

Figure 4:
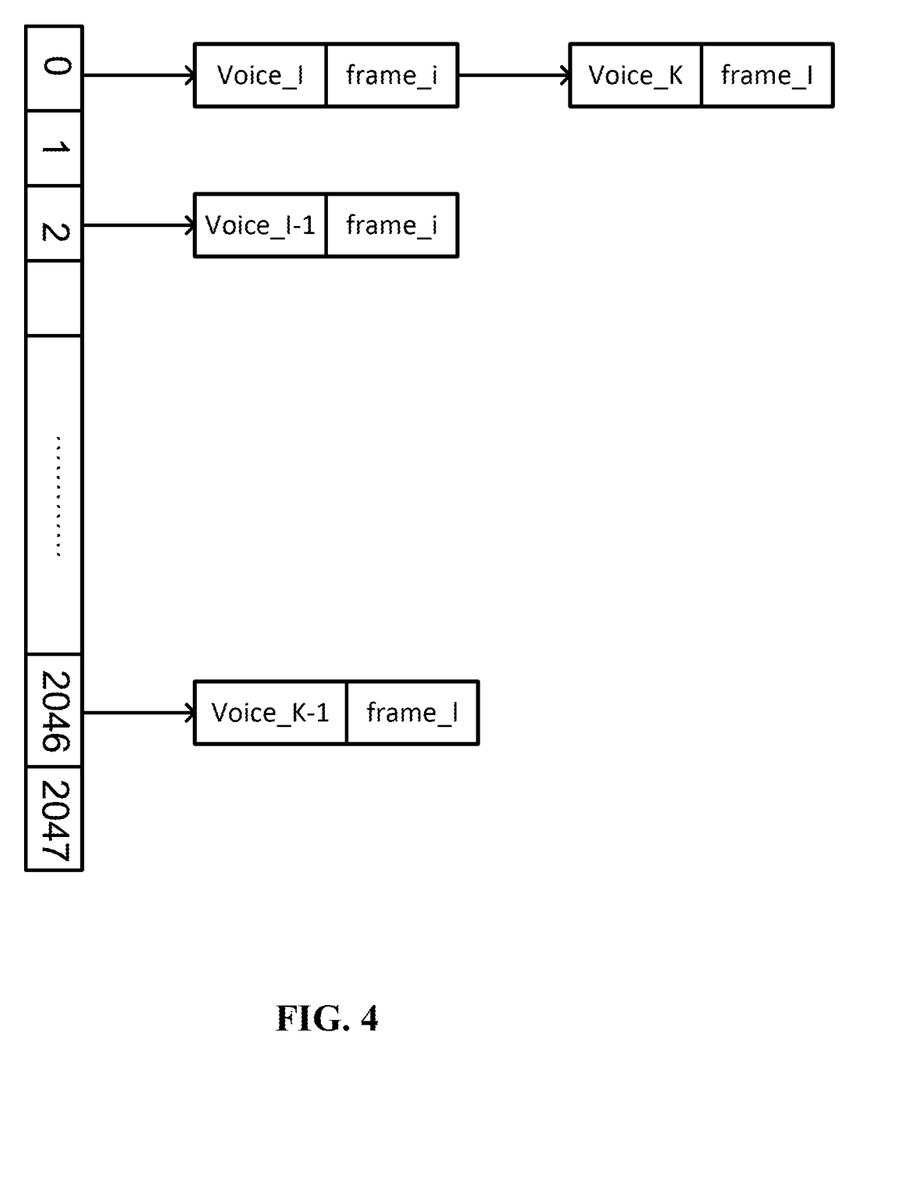
FIG. 4 is a schematic diagram of an audio characteristic value comparison table according to the present disclosure.

In the above process of establishing the audio characteristic value comparison table, the process of characteristic value calculation and the principles and manners involved thereby are identical with those for obtaining characteristic values of the audio data to be recognized, and will not be repeated herein. The difference is in that, when the audio characteristic value comparison table is to be established, the process may use the characteristic value as a root node, and according to the characteristic value of each frame of the each segment of sample audio, attach each frame of the each segment of sample audio to the corresponding root node to form a corresponding relationship. For example, assuming that the originally obtained vector is a 12-dimensional vector, then the ultimately obtained established audio characteristic value comparison table is shown in FIG. 4.

To enable quick recognition subsequently, a characteristic array can be included, in addition to the audio characteristic value comparison table shown in FIG. 4, to record characteristic values of all segments of the sample audio.

Since the vector is 12-dimensional, the characteristic value has 2048 ($2^{11}$) possibilities. Therefore, the audio characteristic value comparison table has 2048 root nodes. All frames of audio data (i.e., a frame of a sound signal) having a characteristic value corresponding to each root node are subsequently stored behind the each root node. For example, the $0^{th}$ root node correspondingly has all fingerprint information with a characteristic value of 0 stored behind it. If the characteristic value corresponding to the $j^{th}$ frame of the $i^{th}$ sound is 0, and the characteristic value corresponding to the $l^{th}$ frame of the $k^{th}$ sound is 0, then these sound segments (i, j)(k, l) will be stored under the $0^{th}$ root node.

To achieve the ultimate retrieval and recognition, relatively accurate matching results can be determined by establishing a voting matrix. For example, the process can comprise establishing a voting matrix, wherein the voting matrix is established according to the number of the segments of sample audio and the number of frames of each segment of sample audio. For example, the voting matrix can be a 2-dimensional matrix, in which the number of dimensions of the 2-dimensional matrix represents the quantity of the segments of sample audio in a database, i.e., the number of sound signals in the database and the maximal number of data frames per sound signal. After the voting matrix is established, the following operations can be performed on each frame of the audio data to be recognized: looking up, in the audio characteristic value comparison table, one or more frames of audio data that have the same characteristic value as that of the current frame, and marking a voting label at positions in the voting matrix corresponding to the one or more frames of audio data that have the same audio characteristic value as that of the current frame; then, using the segment of sample audio having the highest number of voting labels that exceeds a preset threshold as a recognition result.

Figure 5:
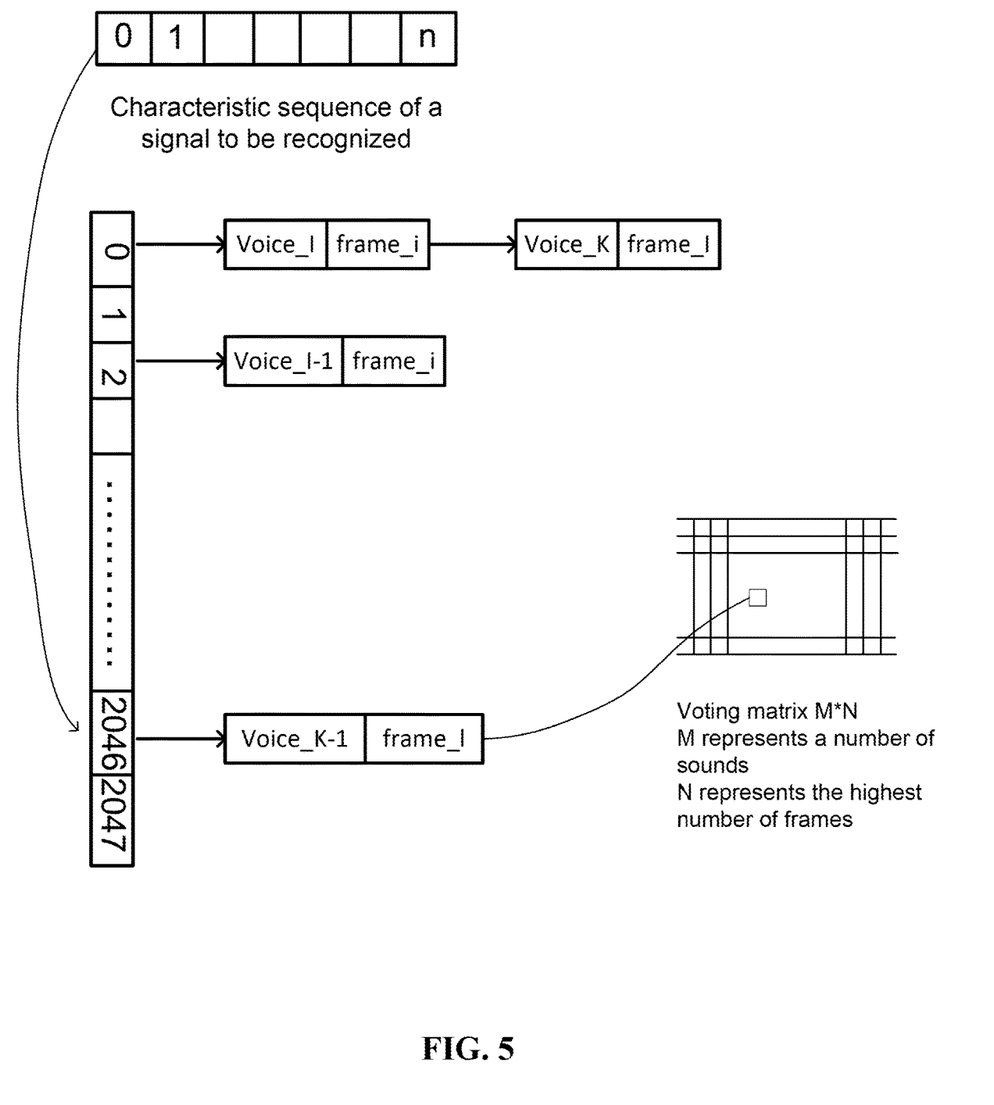
FIG. 5 is a schematic diagram of recognition and matching of audio data to be recognized according to the present disclosure.

As shown in FIG. 5, after a characteristic value for each frame of the segment of the audio data to be recognized is obtained through calculation, a voting operation can be performed to the each frame sequentially according to the audio characteristic value comparison table. For example, for signals in each frame of the audio data to be recognized, the characteristic value "v" is found first, and a corresponding root node is found in a characteristic index table, and all sound signals having the characteristic value of "v" are stored under the node. For example, the characteristic value of the first frame of the audio data to be recognized is 2046, then the $2046^{th}$ root node in the audio characteristic value comparison table is found. Under this node, the $l^{th}$ frame of the $(k-1)^{th}$ sound signal is stored, of which the characteristic value is 2046. Therefore, a "+1" operation is performed at position (k-1,l) in the voting matrix. The "+1" operation represents voting, and the meaning of the voting operation is that the segment of the audio data to be recognized may be from the vicinity of the $l^{th}$ frame of the $(k-1)^{th}$ sound source.

After votes are cast on characteristic values of all frames of the audio data to be recognized, the final voting result can be counted to determine the frames of sound segments that obtain the most votes, indicating that the signal to be recognized is most similar to these sound segments in the database.

In some embodiments, there is a conversion process during voting, i.e., if the $1^{st}$ frame of the audio data to be recognized and the $3^{rd}$ frame of the $5^{th}$ sample audio have the same characteristic value through matching, and when the $4^{th}$ frame of the audio data to be recognized and the $6^{th}$ frame of the $5^{th}$ sample audio have the same characteristic value through subsequent matching, then the label position is also the $1^{st}$ frame of the $5^{th}$ sample audio. Thus, votes are cast at the first matched position of a sample audio for all matching results. In other words, if the $3^{rd}$ frame of the audio data to be recognized and the $6^{th}$ frame of the $8^{th}$ sample audio have the same characteristic value through matching (which is the first time of matching with this sample audio), then when the $4^{th}$ frame of the audio data to be recognized and the $7^{th}$ frame of the $8^{th}$ sample audio have the same characteristic value through subsequent matching, the label position is also the $6^{th}$ frame of the $8^{th}$ sample audio. Votes are cast at the first matched position of a sample audio for all matching results.

Other matching manners can be used. For example, the characteristic value of each frame of the audio data to be recognized is directly matched to a sample audio, and ultimately a matching degree of matching with each sample audio is statistically analyzed. This type of operation is also feasible. However, in comparison, the manner, in which a frame of a sample audio is matched as a starting frame, is obviously more accurate.

Figure 6:
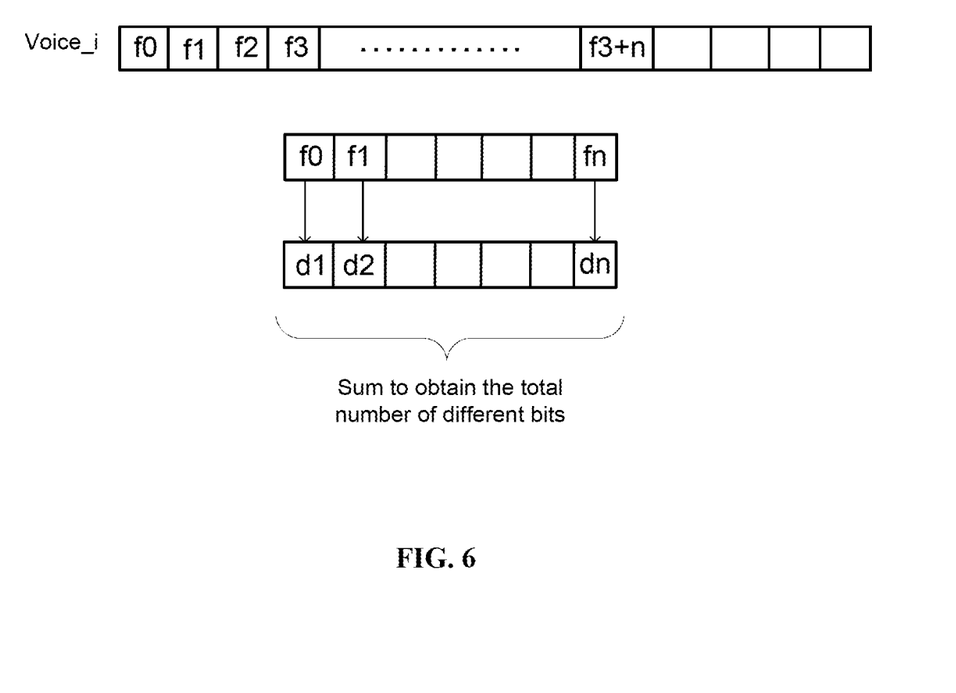
FIG. 6 is a schematic diagram of binary bit summation according to the present disclosure.

In some embodiments, a plurality of results that meet the conditions can sometimes be obtained through matching. To make the final result more accurate, a matching threshold (T) can be set. Subsequent accurate matching can be performed only when the threshold T is exceeded. For example, if the votes for the $3^{rd}$ frame of the $i^{th}$ sample sound is greater than the threshold, then comparison of segments' characteristic values starts from the $3^{rd}$ frame. As shown in FIG. 6, assuming that the characteristic value of the $3^{rd}$ frame of voice_i is f3 and the characteristic value of the $1^{st}$ frame of the signal to be recognized is f0, then the comparison is performed in the manner that f3 and f0 are converted into two binary sequences and then the number of different digits of the two binary sequences is counted. The comparison can be performed by looking up a table. For example, 11-digit binary sequences are compared. The 11-digit binary sequences each correspond to a decimal characteristic value. Therefore, for comparison of similarity between the two characteristic values, the characteristic values are first converted to binary sequences, and then the number of different digits of the two binary sequences is counted. Since the audio data to be recognized typically comprises multiple frames of data, the comparison results for the multiple frames can be added, and the voting position corresponding to the minimum value of the ultimate counting results is determined to be the recognition result. For example, the minimum value of the ultimate counting results refers to the minimal number of the different digits of the two binary sequences.

In some embodiments, matching and recognition can be performed between the characteristic value of each frame of the audio data to be recognized and the pre-established audio characteristic value comparison table to find one or more segments of sample audio having a matching degree of matching with the audio data to be recognized greater than the preset threshold. For example, the matching degree measures how closely the segments of sample audio match the audio data to be recognized. Then, the segment of sample audio having the highest matching degree is determined among the one or more segments of sample audio as the recognition result. For example, the following operations can be performed on each of the one or more segments of sample audio: determining the number of the frames of the audio data to be recognized, acquiring a binary sequence for the each frame of the audio data to be recognized, and determining a number of digits having the same bit positions but different bit values between the binary sequence for each frame of the audio data to be recognized and a binary sequence for each frame of each segment of sample audio corresponding to the audio data to be recognized; and using the segment of sample audio having the least number of digits that have different bit values in the one or more segments of sample audio as the recognition result.

For example, the first binary sequence is 0010001, the second binary sequence is 1010000, and then the comparison result is one or "1." That is, the first binary sequence (e.g., the binary sequence for a frame of the segment of sample audio) only has one digit or bit different from the second binary sequence (e.g., the binary sequence for the frame of the segment of the audio data to be recognized).

The method for audio recognition described in the example above has good robustness. Meanwhile, the proposed recognition method has a fast recognition speed and can be used subsequently in scenarios such as interactive TV and music recognition. In the present example, no extremum points are extracted in the frequency domain. Instead, a comparative relationship between frames and within a frame is used to obtain a relatively stable encoding result. Such an encoding manner can effectively resist the interference of noise, thereby achieving better audio recognition results.

In some embodiments, a device for audio recognition is further provided in the embodiments of the present invention, as described in the following embodiments. As the principle of the device for audio recognition to solve the problems is similar to that of the method for audio recognition, the implementation of the method for audio recognition can be referenced for the implementation of the device for audio recognition, and repetitions thereof will not be described herein. The term "unit" or "module" used below refers to a combination of software and/or hardware capable of achieving preset functions. The device described in the following embodiments is preferably achieved by software; however, it is also possible and can be conceived that the device is achieved by hardware or a combination of software and hardware.

Figure 7:
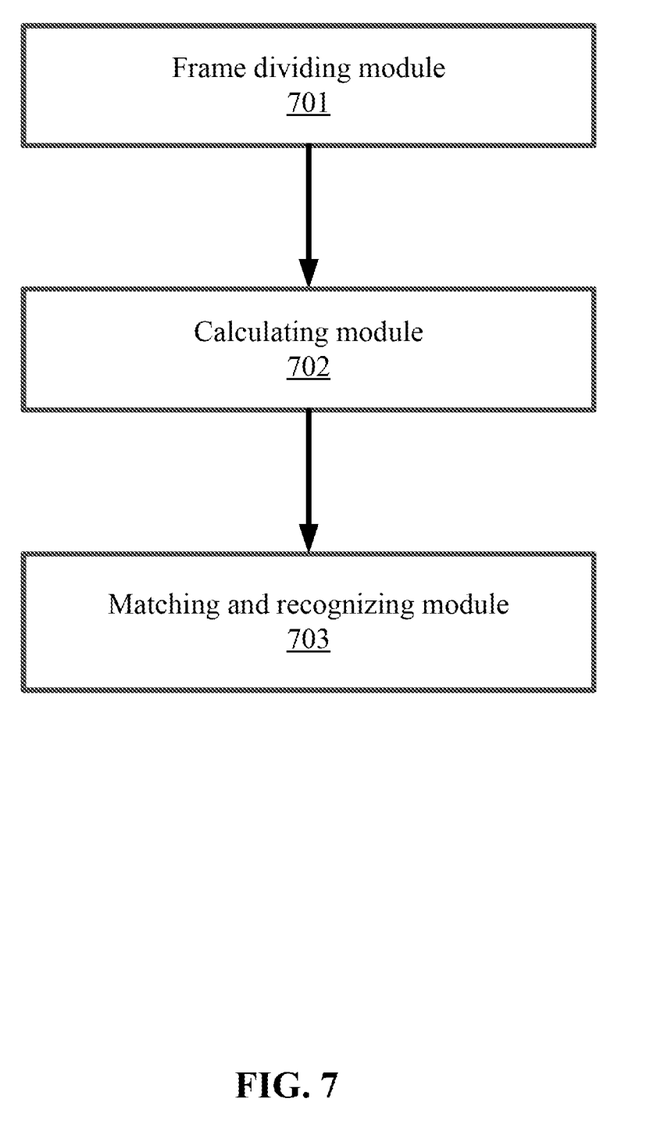
FIG. 7 is a schematic diagram of a modular structure of a device for audio recognition according to the present disclosure.

FIG. 7 is a structural block diagram of a device for audio recognition according to some embodiments of the present disclosure. As shown in FIG. 7, the device can comprise: a frame dividing module 701, a calculating module 702, and a matching and recognizing module 703. This structure will be described below.

The frame dividing module 701 is configured to divide audio data to be recognized to obtain a plurality of frames of the audio data.

The calculating module 702 is configured to calculate, based on audio variation trends among the plurality of frames and within each of the plurality of frames, a characteristic value of each frame of the audio data to be recognized.

The matching and recognizing module 703 is configured to match the characteristic value of each frame of the audio data to be recognized with a pre-established audio characteristic value comparison table to obtain a recognition result, wherein the audio characteristic value comparison table is established based on audio variation trends among frames and within a frame of sample data.

In some embodiments, the above-described device for audio recognition can further comprise: a comparison table establishing module configured to pre-establish an audio characteristic value comparison table, the comparison table establishing module comprising: an acquiring unit configured to acquire sample data, wherein the sample data comprises multiple segments of sample audio; a frame dividing unit configured to divide each of the multiple segments of sample audio to obtain a plurality of frames of audio data for each segment of the sample audio; a calculating unit configured to calculate, based on audio variation trends among the plurality of frames and within each of the plurality of frames, a characteristic value of each frame of each segment of the sample audio; a relationship determining unit configured to use the characteristic values as root nodes, and according to the characteristic value of each frame of each segment of the sample audio, attaching each frame of the each segment of the sample audio to a corresponding one of the root nodes to form a corresponding relationship; and a generating unit configured to use the corresponding relationships as the audio characteristic value comparison table.

In some embodiments, the matching and recognizing module 703 can comprise: an establishing unit configured to establish a voting matrix, wherein the voting matrix is established according to the number of the segments of sample audio and the number of frames of each segment of sample audio; a performing unit configured to perform the following operations on each frame of the audio data to be recognized: looking up, in the audio characteristic value comparison table, one or more frames of audio data that have the same characteristic value as that of the current frame, and marking a voting label at positions in the voting matrix corresponding to the one or more frames of audio data that have the same audio characteristic value as that of the current frame; and a result generating unit configured to use the segment of sample audio having the highest number of voting labels that exceeds a preset threshold as a recognition result.

In some embodiments, the calculating module 702 can comprise: a first converting unit configured to convert each frame of the audio data to be recognized to vector data of a preset number of dimensions; a second converting unit configured to convert the vector data of each frame of the audio data to a binary sequence according to vector values between adjacent dimensions and vector values of adjacent frames in the vector data of each frame of audio data; and a characteristic value generating unit configured to use the binary sequence obtained from conversion as the characteristic value of a corresponding frame of audio data, or to use a decimal number corresponding to the binary sequence as the characteristic value of a corresponding frame of data.

In some embodiments, the second converting unit can be configured to convert, according to the following equation, the vector data of each frame of audio data to a binary sequence:

$$\begin{cases} t1 = d_{i-2,j} - d_{i-2,j+1} \\ t2 = d_{i-1,j} - d_{i-1,j+1} \\ t3 = d_{i+1,j} - d_{i+1,j+1} \\ t4 = d_{i+2,j} - d_{i+2,j+1} \end{cases}$$

-continued $$diff = -n*t1 - m*t2 + m*t3 + n2*t4$$

$$Bit_{i,j} = \begin{cases} 1 & diff > 0 \\ 0 & \text{otherwise} \end{cases}$$

where $d_{i-2,j}$ represents the vector value in the $j^{th}$ dimension of the $(i-2)^{th}$ frame of audio data, $d_{i-2,j+1}$ represents the vector value in the $(j+1)^{th}$ dimension of the $(i-2)^{th}$ frame of audio data, $d_{i-1,j}$ represents the vector value in the $j^{th}$ dimension of the $(i-1)^{th}$ frame of audio data, $d_{i-1,j+1}$ represents the vector value in the $(j+1)^{th}$ dimension of the $(i-1)^{th}$ frame of audio data, $d_{i+1,j}$ represents the vector value in the $j^{th}$ dimension of the $(i+1)^{th}$ frame of audio data, $d_{i+1,j+1}$ represents the vector value in the $(j+1)^{th}$ dimension of the $(i+1)^{th}$ frame of audio data, $d_{i+2,j}$ represents the vector value in the $j^{th}$ dimension of the $(i+2)^{th}$ frame of audio data, $d_{i+2,j+1}$ represents the vector value in the $(j+1)^{th}$ dimension of the $(i+2)^{th}$ frame of audio data, t1, t2, t3, t4 and diff represent intermediate variables, $Bit_{i,j}$ represents the value of the $j^{th}$ bit of the binary sequence of the $i^{th}$ frame of audio data, and n, m are constant coefficients.

In some embodiments, the first converting unit can be configured to convert, through an MCFF characteristic parameter extraction algorithm, each frame of the audio data to be recognized to a vector of a preset number of dimensions.

In some embodiments, the preset number of dimensions can be 12.

In some embodiments, the matching and recognizing module 703 can comprise: a recognizing unit configured to match the characteristic value of each frame of the audio data to be recognized with the pre-established audio characteristic value comparison table to find one or more segments of sample audio having a degree of matching with the audio data to be recognized greater than the preset threshold; and a matching unit configured to determine the segment of sample audio having the highest matching degree among the one or more segments of sample audio as the recognition result.

In some embodiments, the matching unit can comprise: a performing sub-unit configured to perform the following operations on each of the one or more segments of sample audio: determining the number of the frames of the audio data to be recognized, acquiring a binary sequence for the each frame of the audio data to be recognized, acquiring a binary sequence for each frame of the current segment of sample audio corresponding to the audio data to be recognized, and determining the number of digits having the same bit positions but different bit values between the binary sequence for each frame of the audio data to be recognized and the binary sequence for each frame of the current segment of sample audio corresponding to the audio data to be recognized; and a matching sub-unit configured to use the segment of sample audio having the least number of digits that have different bit values in the one or more segments of sample audio as the recognition result.

In some embodiments, the frame dividing module 701 can be configured to divide the audio data to be recognized into frames according to a division rule that adjacent frames are set to have an overlap of a preset number of milliseconds.

In some embodiments, the various modules and units of the device in FIG. 7 may be implemented as software instructions. That is, the device in FIG. 7 may comprise a processor and a non-transitory computer-readable storage medium storing instructions that, when executed by the processor, cause one or more components of the device (e.g., the processor) to perform various steps and methods of the modules and units described above. In some embodiments, the device in FIG. 7 may be referred to as a system for audio recognition.

The method and the device for audio recognition according to the present disclosure calculate, based on audio variation trends among frames and within a frame, a characteristic value of each frame of the audio data to be recognized, and then match the characteristic value of each frame with a pre-established audio characteristic value comparison table to obtain a recognition result. No extremum points are extracted in the frequency domain. Instead, a comparative relationship between frames and within a frame is used to obtain a relatively stable encoding result, which can effectively resist the interference of noise, such that the recognition result is more accurate. The solution according to the present disclosure can not only greatly improve noise immunity, but also effectively improve the recognition success rate and the accuracy of recognition results.

The above description of the embodiments of the present disclosure is merely applications of some embodiments of the present disclosure. The solutions of the above embodiments of the present disclosure can also be performed in implementation manners with slight modifications based on some standards, models, and methods. Other non-creative variations of the steps in the processing methods set forth in the above embodiments of the present disclosure can still achieve the same application, and will not be repeated herein.

The present disclosure provides operating steps of the method as shown in the embodiments or flow charts; however, more or fewer operation steps can be comprised in the method according to conventional practices or without creative effort. The order of these steps listed in the embodiments is merely one of numerous step execution orders and does not represent the only execution order. When applied in a device or client product, the steps can be executed sequentially or in parallel according to the method as shown in the embodiments or accompanying drawings (e.g., through parallel processors or in a multithreading environment).

The device or modules described in the above embodiments may be implemented by a computer chip or entity, or implemented by a product having a type of function. For convenience of description, the above device has been divided into various modules according to functions for respective description. When implementing the present disclosure, functions of the modules can be implemented in one or multiple pieces of software and/or hardware. A module of a function can also be embodied by combining a plurality of sub-modules or sub-units.

The method, device or modules described in the present disclosure can be implemented by a controller through computer readable program code in any proper manner. For example, a controller may be in a form of a microprocessor or processor, as well as a computer readable medium that stores computer readable program code (e.g. software or firmware) executable by the (micro) processor, a logic gate, a switch, an Application Specific Integrated Circuit (ASIC), a programmable logic controller and an embedded microcontroller. Examples of the controller include, but are not limited to, the following microcontrollers: ARC 625D, Atmel AT91SAM, Microchip PIC18F26K20, and Silicone Labs C8051F320. A memory controller may further be implemented as a part of a control logic of a memory. A person skilled in the art should also be aware that, in addition to that a controller is implemented in a manner of pure computer readable program code, it is totally feasible to perform logic programming on steps of a method to enable a controller to achieve the same functions in the form of a logic gate, a switch, an ASIC, a programmable logic controller, and an embedded microcontroller. Therefore, such controller can be deemed as a hardware part, while devices comprised therein and configured to achieve various functions may also be deemed as structures inside the hardware part. Alternatively, devices configured to achieve various functions may even be deemed as either software modules to implement a method or structures inside a hardware part.

Some modules in the device according to the present disclosure may be described in a regular context of a computer executable instruction that is executed by a computer, e.g., may be program modules. Generally, a program module comprises a routine, a program, an object, a component, a data structure, and the like for executing a particular task or achieving a particular abstract data type. The present disclosure may also be practiced in distributed computing environments. In these distributed computing environments, remote processing devices connected via communication networks carry out tasks. In the distributed computing environments, a program module can be located in local and remote computer storage media, including storage devices.

According to the above description of the manners of implementation, a person skilled in the art can clearly understand that the present disclosure can be implemented by software plus necessary hardware. Based on such understanding, the technical solution of the present disclosure can be embodied, in essence or with respect to the part contributing to current technologies, in the form of a software product, or can be embodied through a process of implementing data migration. The computer software product can be stored in a storage medium, such as ROM/RAM, magnetic disc, optical disc, and the like, and may comprise a number of instructions to enable a computer device (which may be a personal computer, a mobile terminal, a server, or a network device) to carry out the methods set forth in the embodiments or some parts of the embodiments of the present disclosure.

The embodiments in this specification have been described in a progressive manner. Each embodiment focuses on differences from other embodiments, and the embodiments may be mutually referenced for identical or similar parts thereof. All or a part of the present disclosure can be used in numerous general or dedicated computer system environments or configurations, such as personal computers, server computers, handheld devices or portable devices, panel devices, mobile communication terminals, multi-processor systems, microprocessor-based systems, programmable electronic devices, network PC, small-scale computers, large-scale computers, a distributed computing environment comprising any of the above systems or devices, and the like.

The present disclosure has been described through the embodiments; however, a person skilled in the art should be aware that there are many variations and modifications of the present disclosure without departing from the spirit of the present disclosure. It is intended that the appended claims encompass these variations and modifications without departing from the spirit of the present disclosure.

What is claimed is:

1. A method for audio recognition, comprising:
    establishing an audio characteristic value comparison table based on audio variation trends among frames and within each of the frames of sample data, the sample data including multiple segments of sample audio;
    obtaining, from a sound signal, audio data to be recognized;
    dividing the audio data to be recognized to obtain a plurality of frames of the audio data;
    calculating, based on audio variation trends among the plurality of frames and within each of the plurality of frames, a characteristic value for each frame of the audio data to be recognized;
    establishing a voting matrix according to the number of segments of the sample audio and the number of frames of each segment of the sample audio;
    determining, by looking up in the audio characteristic value comparison table, a first frame of a segment of the sample audio that has the same characteristic value as that of a first frame of the audio data to be recognized, and marking a voting label at a position in the voting matrix corresponding to the first frame of the segment of the sample audio;
    in response to determining that one or more second frames of the segment of the sample audio have the same characteristic values as those of one or more second frames of the audio data to be recognized, respectively marking one or more voting labels at the position in the voting matrix corresponding to the first frame of the segment of the sample audio, the one or more second frames of the audio data to be recognized coming after the first frame in the audio data to be recognized and the one or more second frames of the segment of the sample audio coming alter the first frame of the segment of the sample audio; and
    in response to determining that a sum of the voting labels at the position in the voting matrix corresponding to the first frame of the segment of the sample audio is higher than a threshold, using the first frame of the segment of the sample audio as a starting frame to match the characteristic values of the segment of the sample audio and the audio data to be recognized to obtain a recognition result.

2. The method according to claim 1, wherein the method further comprises establishing the audio characteristic value comparison table by performing operations comprising:
    acquiring the sample data;
    dividing each of the multiple segments of the sample audio to obtain a plurality of the frames for each segment of the sample audio;
    calculating, based on audio variation trends among the plurality of frames and within each of the plurality of frames for each segment of the sample audio, the characteristic value of each frame of each segment of the sample audio;
    using the characteristic values as root nodes, and according to the characteristic value of each frame of each segment of the sample audio, attaching each frame of each segment of the sample audio to a corresponding one of the root nodes to form a corresponding relationship; and
    using the corresponding relationships as the audio characteristic value comparison table.

3. The method according to claim 1, wherein calculating, based on audio variation trends among the plurality of frames and within each of the plurality of frames, a characteristic value of each frame of the audio data to be recognized comprises:

converting each of the plurality of frames of the audio data to be recognized to vector data of a preset number of dimensions;

converting the vector data of each frame of the audio data to be recognized to a binary sequence according to vector values between adjacent dimensions and vector values of adjacent frames in the vector data of each frame of the audio data; and using the binary sequence obtained from conversion as the characteristic value of a corresponding frame of the audio data, or using a decimal number corresponding to the binary sequence as the characteristic value of a corresponding frame of the audio data.

4. The method according to claim 3, wherein converting the vector data of each frame of the audio data to be recognized to a binary sequence according to vector values between adjacent dimensions and vector values of adjacent frames in the vector data of each frame of audio data comprises:

converting, according to the following equations, the vector data of each frame of the audio data to be recognized to a binary sequence:

$$\begin{cases} t1 = d_{i-2,j} - d_{i-2,j+1} \\ t2 = d_{i-1,j} - d_{i-1,j+1} \\ t3 = d_{i+1,j} - d_{i+1,j+1} \\ t4 = d_{i+2,j} - d_{i+2,j+1} \end{cases}$$

$$\mathit{diff} = -n*t1 - m*t2 + m*t3 + n*t4$$

$$Bit_{i,j} = \begin{cases} 1 & \mathit{diff} > 0 \\ 0 & \text{otherwise} \end{cases}$$

where $d_{i-2,j}$ represents the vector value in the $j^{th}$ dimension of the $(i-2)^{th}$ frame of audio data, $d_{i-2,j+1}$ represents the vector value in the $(j+1)^{th}$ dimension of the $(i-2)^{th}$ frame of audio data, $d_{i-1,j}$ represents the vector value in the $j^{th}$ dimension of the $(i-1)^{th}$ frame of audio data, $d_{i-1,j+1}$ represents the vector value in the $(j+1)^{th}$ dimension of the $(i-1)^{th}$ frame of audio data, $d_{i+1,j}$ represents the vector value in the $j^{th}$ dimension of the $(i+1)^{th}$ frame of audio data, $d_{i+1,j+1}$ represents the vector value in the $(j+1)^{th}$ dimension of the $(i+1)^{th}$ frame of audio data, $d_{i+2,j}$ represents the vector value in the $j^{th}$ dimension of the $(i+2)^{th}$ frame of audio data, $d_{i+2,j+1}$ represents the vector value in the $(j+1)^{th}$ dimension of the $(i+2)^{th}$ frame of audio data, t1, t2, t3, t4 and duff represent intermediate variables, $Bit_{i,j}$ represents the value of the $j^{th}$ bit of the binary sequence of the $i^{th}$ frame of audio data, and n, m are constant coefficients.

5. The method according to claim 3, wherein converting each frame of the audio data to be recognized to vector data of a preset number of dimensions comprises:

converting, through an MFCC characteristic parameter extraction algorithm, each frame of the audio data to be recognized to vector data of a preset number of dimensions.

6. The method according to claim 3, wherein the preset number of dimensions is 12.

7. The method according to claim 3, wherein matching the characteristic value of each frame of the audio data to be recognized with a pre-established audio characteristic value comparison table to obtain a recognition result comprises:

matching the characteristic value of each frame of the audio data to be recognized with the pre-established audio characteristic value comparison table to find one or more segments of sample audio of the sample data having a matching degree of matching with the audio data to be recognized greater than the preset threshold; and determining the segment of sample audio having the highest matching degree among the one or more segments of the sample audio as the recognition result.

8. The method according to claim 7, wherein determining the segment of sample audio having the highest matching degree among the one or more segments of the sample audio as the recognition result comprises:

performing the following operations on each of the one or more segments of sample audio: determining a number of the frames of the audio data to be recognized, acquiring a binary sequence for each frame of the audio data to be recognized, acquiring a binary sequence for each frame of a current segment of sample audio corresponding to the audio data to be recognized, and determining the number of digits having the same bit positions but different bit values between the binary sequence for each frame of the audio data to be recognized and the binary sequence for each frame of the current segment of sample audio corresponding to the audio data to be recognized; and using the segment of sample audio having the least number of digits that have different bit values in the one or more segments of sample audio as the recognition result.

9. The method according to claim 1, wherein dividing audio data to be recognized into frames comprises:

dividing the audio data to be recognized into frames according to a division rule that adjacent frames are set to have an overlap of a preset number of milliseconds.

10. A non-transitory computer-readable storage medium storing instructions executable by a processor to cause the processor to perform operations comprising:

establishing an audio characteristic value comparison table based on audio variation trends among frames and within each of the frames of sample data, the sample data including multiple segments of sample audio;

obtaining, from a sound signal, audio data to be recognized;

dividing the audio data to be recognized to obtain a plurality of frames of the audio data;

calculating, based on audio variation trends among the plurality of frames and within each of the plurality of frames, a characteristic value for each frame of the audio data to be recognized;

establishing a voting matrix according to the number of segments of the sample audio and the number of frames of each segment of the sample audio;

determining, by looking up in the audio characteristic value comparison table, a first frame of a segment of the sample audio that has the same characteristic value as that of a first frame of the audio data to be recognized, and marking a voting label at a position in the voting matrix corresponding to the first frame of the segment of the sample audio;

in response to determining that one or more second frames of the segment of the sample audio have the same characteristic values as those of one or more second frames of the audio data to be recognized, respectively marking one or more voting labels at the position in the voting matrix corresponding to the first frame of the segment of the sample audio, the one or more second frames of the audio data to be recognized coming after the first frame in the audio data to be recognized and the one or more second frames of the segment of the sample audio coming alter the first frame of the segment of the sample audio; and in response to determining that a sum of the voting labels at the position in the voting matrix corresponding to the first frame of the segment of the sample audio is higher than a threshold, using the first frame of the segment of the sample audio as a starting frame to match the characteristic values of the segment of the sample audio and the audio data to be recognized to obtain a recognition result.

11. The non-transitory computer-readable storage medium in claim 10, wherein the operations comprise establishing the audio characteristic value comparison table, which comprises:

acquiring the sample data;

dividing each of the multiple segments of the sample audio to obtain a plurality of the frames for each segment of the sample audio;

calculating, based on audio variation trends among the plurality of frames and within each of the plurality of frames for each segment of the sample audio, the characteristic value of each frame of each segment of the sample audio;

using the characteristic values as root nodes, and according to the characteristic value of each frame of each segment of the sample audio, attaching each frame of each segment of the sample audio to a corresponding one of the root nodes to form a corresponding relationship; and using the corresponding relationships as the audio characteristic value comparison table.

12. The non-transitory computer-readable storage medium in claim 10, wherein calculating, based on audio variation trends among the plurality of frames and within each of the plurality of frames, a characteristic value of each frame of the audio data to be recognized comprises:

converting each of the plurality of frames of the audio data to be recognized to vector data of a preset number of dimensions;

converting the vector data of each frame of the audio data to be recognized to a binary sequence according to vector values between adjacent dimensions and vector values of adjacent frames in the vector data of each frame of the audio data; and using the binary sequence obtained from conversion as the characteristic value of a corresponding frame of the audio data, or using a decimal number corresponding to the binary sequence as the characteristic value of a corresponding frame of the audio data.

13. The non-transitory computer-readable storage medium in claim 12, wherein converting the vector data of each frame of the audio data to be recognized to a binary sequence according to vector values between adjacent dimensions and vector values of adjacent frames in the vector data of each frame of audio data comprises:

converting, according to the following equations, the vector data of each frame of the audio data to be recognized to a binary sequence:

$$\begin{cases} t1 = d_{i-2,j} - d_{i-2,j+1} \\ t2 = d_{i-1,j} - d_{i-1,j+1} \\ t3 = d_{i+1,j} - d_{i+1,j+1} \\ t4 = d_{i+2,j} - d_{i+2,j+1} \end{cases}$$

-continued $$\mathit{diff} = -n*t1 - m*t2 + m*t3 + n2*t4$$

$$Bit_{i,j} = \begin{cases} 1 & \mathit{diff} > 0 \\ 0 & \text{otherwise} \end{cases}$$

where $d_{i-2,j}$ represents the vector value in the $j^{th}$ dimension of the $(i-2)^{th}$ frame of audio data, $d_{i-2,j+1}$ represents the vector value in the $(j+1)^{th}$ dimension of the $(i-2)^{th}$ frame of audio data, $d_{i-1,j}$ represents the vector value in the $j^{th}$ dimension of the $(i-1)^{th}$ frame of audio data, $d_{i-1,j+1}$ represents the vector value in the $(j+1)^{th}$ dimension of the $(i-1)^{th}$ frame of audio data, $d_{i+1,j}$ represents the vector value in the $j^{th}$ dimension of the $(i+1)^{th}$ frame of audio data, $d_{i+1,j+1}$ represents the vector value in the $(j+1)^{th}$ dimension of the $(i+1)^{th}$ frame of audio data, $d_{i+2,j}$ represents the vector value in the $j^{th}$ dimension of the $(i+2)^{th}$ frame of audio data, $d_{i+2,j+1}$ represents the vector value in the $(j+1)^{th}$ dimension of the $(i+2)^{th}$ frame of audio data, t1, t2, t3, t4 and duff represent intermediate variables, $Bit_{i,j}$ represents the value of the $j^{th}$ bit of the binary sequence of the $i^{th}$ frame of audio data, and n, m are constant coefficients.

14. The non-transitory computer-readable storage medium in claim 12, wherein converting each frame of the audio data to be recognized to vector data of a preset number of dimensions comprises:

converting, through an MFCC characteristic parameter extraction algorithm, each frame of the audio data to be recognized to vector data of a preset number of dimensions.

15. The non-transitory computer-readable storage medium in claim 12, wherein the preset number of dimensions is 12.

16. The non-transitory computer-readable storage medium in claim 12, wherein matching the characteristic value of each frame of the audio data to be recognized with a pre-established audio characteristic value comparison table to obtain a recognition result comprises:

matching the characteristic value of each frame of the audio data to be recognized with the pre-established audio characteristic value comparison table to find one or more segments of the sample audio of the sample data having a matching degree of matching with the audio data to be recognized greater than the preset threshold; and determining the segment of the sample audio having the highest matching degree among the one or more segments of the sample audio as the recognition result.

17. The non-transitory computer-readable storage medium in claim 16, wherein determining the segment of the sample audio having the highest matching degree among the one or more segments of the sample audio as the recognition result comprises:

performing the following operations on each of the one or more segments of the sample audio: determining a number of the frames of the audio data to be recognized, acquiring a binary sequence for each frame of the audio data to be recognized, acquiring a binary sequence for each frame of a current segment of the sample audio corresponding to the audio data to be recognized, and determining the number of digits having the same bit positions but different bit values between the binary sequence for each frame of the audio data to be recognized and the binary sequence for each frame of the current segment of the sample audio corresponding to the audio data to be recognized; and using the segment of the sample audio having the least number of digits that have different bit values in the one or more segments of the sample audio as the recognition result.

18. A system comprising:

a processor; and a non-transitory computer-readable storage medium storing instructions executable by the processor to cause the processor to perform operations comprising:

establishing an audio characteristic value comparison table based on audio variation trends among frames and within each of the frames of sample data, the sample data including multiple segments of sample audio;

obtaining, from a sound signal, audio data to be recognized;

dividing the audio data to be recognized to obtain a plurality of frames of the audio data;

calculating, based on audio variation trends among the plurality of frames and within each of the plurality of frames, a characteristic value for each frame of the audio data to be recognized;

establishing a voting matrix according to the number of segments of the sample audio and the number of frames of each segment of the sample audio;

determining, by looking up in the audio characteristic value comparison table, a first frame of a segment of the sample audio that has the same characteristic value as that of a first frame of the audio data to be recognized, and marking a voting label at a position in the voting matrix corresponding to the first frame of the segment of the sample audio;

in response to determining that one or more second frames of the segment of the sample audio have the same characteristic values as those of one or more second frames of the audio data to be recognized, respectively marking one or more voting labels at the position in the voting matrix corresponding to the first frame of the segment of the sample audio, the one or more second frames of the audio data to be recognized coming after the first frame in the audio data to be recognized and the one or more second frames of the segment of the sample audio coming alter the first frame of the segment of the sample audio; and in response to determining that a sum of the voting labels at the position in the voting matrix corresponding to the first frame of the segment of the sample audio is higher than a threshold, using the first frame of the segment of the sample audio as a starting frame to match the characteristic values of the segment of the sample audio and the audio data to be recognized to obtain a recognition result.

19. The system in claim 18, wherein the operations comprise establishing the audio characteristic value comparison table, which comprises:

acquiring the sample data;

dividing each of the multiple segments of the sample audio to obtain a plurality of the frames for each segment of the sample audio;

calculating, based on audio variation trends among the plurality of frames and within each of the plurality of frames for each segment of the sample audio, the characteristic value of each frame of each segment of the sample audio;

using the characteristic values as root nodes, and according to the characteristic value of each frame of each segment of the sample audio, attaching each frame of each segment of the sample audio to a corresponding one of the root nodes to form a corresponding relationship; and using the corresponding relationships as the audio characteristic value comparison table.

* * * * *